United States Patent
Mitsumoto et al.

(10) Patent No.: US 9,640,794 B2
(45) Date of Patent: May 2, 2017

(54) LITHIUM TRANSITION METAL OXIDE HAVING LAYERED STRUCTURE

(71) Applicant: Mitsui Mining & Smelting Co., Ltd., Tokyo (JP)

(72) Inventors: Tetsuya Mitsumoto, Takehara (JP); Hitohiko Ide, Takehara (JP); Shinya Kagei, Takehara (JP); Yoshimi Hata, Takehara (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/396,510

(22) PCT Filed: Apr. 16, 2013

(86) PCT No.: PCT/JP2013/061246
§ 371 (c)(1),
(2) Date: Oct. 23, 2014

(87) PCT Pub. No.: WO2013/161619
PCT Pub. Date: Oct. 31, 2013

(65) Prior Publication Data
US 2015/0093641 A1  Apr. 2, 2015

(30) Foreign Application Priority Data
Apr. 27, 2012  (JP) ................. 2012-103383

(51) Int. Cl.
*H01M 4/131* (2010.01)
*H01M 4/505* (2010.01)
(Continued)

(52) U.S. Cl.
CPC ............ *H01M 4/131* (2013.01); *C01G 53/50* (2013.01); *H01M 4/485* (2013.01); *H01M 4/505* (2013.01);
(Continued)

(58) Field of Classification Search
CPC ...................................... H01M 4/36
See application file for complete search history.

(56) References Cited

U.S. PATENT DOCUMENTS

2006/0057466 A1  3/2006  Suhara et al.
2007/0099087 A1  5/2007  Mihara et al.
(Continued)

FOREIGN PATENT DOCUMENTS

JP  08-171910 A  7/1996
JP  2003-017052 A  1/2003
(Continued)

*Primary Examiner* — Jeremiah Smith
(74) *Attorney, Agent, or Firm* — The Webb Law Firm

(57) ABSTRACT

Provided is a lithium metal compound oxide having a layered structure, which is very excellent as a positive electrode active material of a battery that is mounted on, particularly, an electric vehicle or a hybrid vehicle.

Suggested is a lithium metal compound oxide having a layered structure which is expressed by general formula of $Li_{1+x}M_{1-x}O_2$ (M represents metal elements including three elements of Mn, Co, and Ni). In the lithium metal compound oxide having a layered structure, D50 is more than 4 µm and less than 20 µm, a ratio of a primary particle area to a secondary particle area of secondary particles having a size corresponding to the D50 ("primary particle area/secondary particle area") is 0.004 to 0.035, and the minimum value of powder crushing strength that is obtained by crushing a powder using a microcompression tester is more than 70 MPa.

10 Claims, 2 Drawing Sheets

(51) Int. Cl.
  *H01M 4/525* (2010.01)
  *C01G 53/00* (2006.01)
  *H01M 4/485* (2010.01)
  *H01M 10/0525* (2010.01)
  *H01M 4/36* (2006.01)

(52) U.S. Cl.
  CPC ....... *H01M 4/525* (2013.01); *H01M 10/0525* (2013.01); *C01P 2004/51* (2013.01); *C01P 2004/61* (2013.01); *C01P 2006/11* (2013.01); *C01P 2006/12* (2013.01); *C01P 2006/14* (2013.01); *C01P 2006/16* (2013.01); *C01P 2006/40* (2013.01); *H01M 4/36* (2013.01); *H01M 2220/20* (2013.01); *Y02E 60/122* (2013.01); *Y02T 10/7011* (2013.01)

(56) References Cited

U.S. PATENT DOCUMENTS

| | | | |
|---|---|---|---|
| 2011/0250499 A1* | 10/2011 | Hiratsuka | 429/223 |
| 2012/0244413 A1 | 9/2012 | Shimano et al. | |
| 2013/0011726 A1 | 1/2013 | Takano et al. | |
| 2013/0130113 A1 | 5/2013 | Takano et al. | |

FOREIGN PATENT DOCUMENTS

| | | |
|---|---|---|
| JP | 2003-034536 A | 2/2003 |
| JP | 2004-253169 A | 9/2004 |
| JP | 2004-355824 A | 12/2004 |
| JP | 2005-089225 A | 4/2005 |
| JP | 2007-257985 A | 10/2007 |
| JP | 2012023015 A | 2/2012 |
| JP | 2012038724 A | 2/2012 |
| WO | 2005028371 A1 | 3/2005 |
| WO | 2008091028 A1 | 7/2008 |
| WO | 2011071094 A1 | 6/2011 |

* cited by examiner

LITHIUM TRANSITION METAL OXIDE HAVING LAYERED STRUCTURE

CROSS-REFERENCE TO RELATED APPLICATIONS

This application is the United States national phase of International Application No. PCT/JP2013/061246 filed Apr. 16, 2013, and claims priority to Japanese Patent Application No. 2012-103383 filed Apr. 27, 2012, the disclosures of which are hereby incorporated in their entirety by reference.

TECHNICAL FIELD

The present invention relates to a lithium metal compound oxide having a layered structure which can be used as a positive electrode active material of a lithium battery, and particularly, to a lithium metal compound oxide which is capable of exhibiting excellent performance as a positive electrode active material of a battery that is mounted on an electric vehicle (EV) or a hybrid electric vehicle (HEV).

BACKGROUND ART

Lithium batteries, and among these, lithium secondary batteries have characteristics such as a large energy density and a long life and have been used as a power supply of home electric appliances such as a video camera, and a portable electronic apparatus such as a notebook personal computer and a cellular phone. Recently, the lithium secondary battery has been applied to a large-sized battery that is mounted on the electric vehicle (EV), the hybrid electric vehicle (HEV), and the like.

The lithium secondary battery is a secondary battery having the following configuration. During charge, lithium is eluted as ions from a positive electrode, moves to a negative electrode, and is stored in the negative electrode. Conversely, during discharge, the lithium ions return to the positive electrode from the negative electrode. It is known that the high energy density of the lithium secondary battery is caused by an electric potential of a positive electrode material.

As a positive electrode active material of the lithium secondary battery, in addition to lithium-manganese oxide ($LiMn_2O_4$) having a spinel structure, lithium metal compound oxides such as $LiCoO_2$, $LiNiO_2$, and $LiMnO_2$ which have a layered structure are known. For example, $LiCoO_2$ has a layered structure in which a lithium atom layer and a cobalt atom layer are alternately overlapped with an oxygen atom layer interposed therebetween, and has large charge and discharge capacity and excellent diffusibility in storage and release of lithium ions. Accordingly, the majority of commercially available lithium secondary batteries are composed of a lithium metal compound oxide such as $LiCoO_2$ having a layered structure.

The lithium metal compound oxides such as $LiCoO_2$ and $LiNiO_2$ which have a layered structure are expressed by general formula of $LiMeO_2$ (Me represents a transition metal). A crystalline structure of the lithium metal compound oxide having the layered structure belongs to a space group R-3m ("-" is commonly attached to an upper portion of "3" and represents a rotary inversion; the same shall apply hereafter), and a Li ion, a Me ion, and an oxide ion occupy a 3a site, a 3b site, and a 6c site, respectively. In addition, it is known that the lithium metal compound oxide shows a layered structure in which a layer (Li layer) composed of Li ions and a layer (Me layer) composed of Me ions are alternately overlapped with an O layer composed of oxide ions interposed therebetween.

In the related art, with regard to the lithium metal compound oxide ($LiM_xO_2$) having a layered structure, for example, Patent Document 1 discloses an active material expressed by formula of $LiNi_xMn_{1-x}O_2$ (in formula, $0.7 \leq x \leq 0.95$) which is obtained by adding an alkali solution to a mixed aqueous solution of manganese and nickel to coprecipitate manganese and nickel, by adding lithium hydroxide to the mixed aqueous solution, and by firing the resultant mixture.

Patent Document 2 discloses a positive electrode active material which is formed from crystal particles of oxides containing three kinds of transition metals, in which a crystal structure of the crystal particles is a layered structure and arrangement of oxygen atoms constituting the oxides is cubic closest packing, and which is expressed by $Li[Li_x(A_PB_QC_R)_{1-x}]O_2$ (in formula, A, B, and C represent three kinds of transition metal elements different from each other, $-0.1 \leq x \leq 0.3$, $0.2 \leq P \leq 0.4$, $0.2 \leq Q \leq 0.4$, and $0.2 \leq R \leq 0.4$).

Patent Document 3 discloses a method of manufacturing a layered lithium-nickel-manganese compound oxide powder to provide a layered lithium-nickel-manganese compound oxide powder having a high bulk density. The method includes drying slurry, which contains at least a lithium source compound, a nickel source compound, and a manganese source compound that are pulverized and mixed in a range of 0.7 to 9.0 in terms of a molar ratio [Ni/Mn] between a nickel atom [Ni] and a manganese atom [Mn] by spray drying, firing the resultant compound obtained by drying the slurry to form a layered lithium-nickel-manganese compound oxide powder, and pulverizing the compound oxide powder.

Patent Document 4 discloses a material which contains a lithium transition metal compound oxide obtained by mixing-in vanadium (V) and/or boron (B) to make a crystallite size large, that is, a lithium transition metal compound oxide expressed by general formula of $Li_xM_yO_{Z-\delta}$ (in formula, M represents Co or Ni that is a transition metal element, and a relation of (X/Y)=0.98 to 1.02 and a relation of $(\delta/Z) \leq 0.03$ are satisfied), and contains vanadium (V) and/or boron (B) in a ratio of ((V+B)/M)=0.001 to 0.05 (molar ratio) with respect to the transition metal element (M) that constitutes the lithium metal compound oxide. In the material, a primary particle size is 1 μm or more, a crystallite size is 450 Å or more, and a lattice strain is 0.05% or less.

An object of Patent Document 5 is to provide a positive electrode active material for a nonaqueous secondary battery which is formed from primary particles and which retains a high bulk density and battery characteristics without occurrence of cracking, and Patent Document 5 suggests a positive electrode active material for a nonaqueous secondary battery which is a powdered lithium compound oxide of monodispersed primary particles containing one kind of element selected from a group consisting of Co, Ni, and Mn, and lithium as a main component, and in which D50 is 3 μm to 12 μm, a specific surface area is 0.2 m²/g to 1.0 m²/g, a bulk density is 2.1 g/cm³ or more, and an inflection point of a volume reduction rate according to a Copper Plot method does not appear before 3 ton/cm².

Patent Document 6 suggests a positive electrode active material for a nonaqueous electrolyte secondary battery. The positive electrode active material relates to a lithium metal compound oxide powder expressed by $Li_zNi_{1-w}M_wO_2$ (provided that, M represents at least one or more kinds of metal elements selected from a group consisting of Co, Al, Mg, Mn, Ti, Fe, Cu, Zn, and Ga, and relations of 0<w≤0.25 and 1.0≤z≤1.1 are satisfied). The lithium metal compound oxide powder is composed of primary particles of the lithium metal compound oxide powder and secondary particles that are formed by agglomeration of a plurality of the primary particles. The shape of the secondary particles is spherical or oval spherical. 95% or more of the secondary particles have a particle size of 20 μm or less, an average particle size of the secondary particles is 7 μm to 13 μm, and a tap density of the powder is 2.2 g/cm³ or more. In pore distribution measurement according to a nitrogen absorption method, an average diameter is 40 nm or less, an average volume of pores is 0.001 cm³/g to 0.008 cm³/g. An average crushing strength of the secondary particles is 15 MPa to 100 MPa.

Patent Document 7 suggests a lithium metal compound oxide having a layered structure. In the lithium metal compound oxide, a ratio of a crystallite size to an average powder particle size (D50) is 0.05 to 0.20. The average powder particle size (D50) is obtained by a laser diffraction and scattering type particle size distribution measurement method after carrying out pulverization using, for example, a wet type pulverizer until D50 reaches 2 μm or less to obtain a crushed material, granulating and drying the crushed material using a thermal spray drier or the like, and firing the resultant granulated and dried material.

CITATION LIST

Patent Document

Patent Document 1: JP 8-171910 A
Patent Document 2: JP 2003-17052 A
Patent Document 3: JP 2003-34536 A
Patent Document 4: JP 2004-253169 A
Patent Document 5: JP 2004-355824 A
Patent Document 6: JP 2007-257985 A
Patent Document 7: JP 4213768 B1 (WO 2008/091028)

SUMMARY OF THE INVENTION

Technical Problem

Examples of a known main method of manufacturing a lithium metal compound oxide having a layered structure include a method (also referred to as a "coprecipitation method") in which an alkali solution is added to a mixed aqueous solution obtained by mixing raw materials and dissolving the resultant mixed material in water so as to allow precipitation to occur, lithium hydroxide is added to the mixed aqueous solution, and the resultant mixture is fired which is similar to Patent Document 1 and Patent Document 6 described above, and a method (also referred to as a "spray dry method") in which raw materials are mixed and water is added to the mixture to obtain slurry, the slurry is granulated and dried using a thermal spray drier or the like, and then the dried material is fired which is similar to Patent Document 3 and Patent Document 7 described above.

When using the lithium metal compound oxide powder that is prepared by the coprecipitation method as the positive electrode active material of a lithium secondary battery, it can be seen that excellent characteristics are exhibited in consideration of life characteristics, but there is a tendency that charge and discharge efficiency of a first time is poor. On the other hand, when using the lithium metal compound oxide powder that is prepared by the spray dry method as the positive electrode active material of a lithium secondary battery, it can be seen that excellent characteristic are exhibited in consideration of the charge and discharge efficiency of a first time, but there is a tendency that the life characteristics are poor. In this manner, it is difficult to develop a lithium metal compound oxide powder that exhibits excellent in both of the charge-discharge cycle ability and the charge and discharge efficiency of a first time.

An object of the invention is to provide a new lithium metal compound oxide powder which exhibits excellent characteristics in both charge-discharge cycle ability and charge and discharge efficiency of a first time in a case of using a lithium metal compound oxide having a layered structure in a positive electrode of a battery.

Solution to Problem

According to one embodiment of the invention, there is provided lithium metal compound oxide having a layered structure, which is expressed by general formula of $Li_{1+x}M_{1-x}O_2$ (M represents any one or more kinds among Mn, Co, Ni, transition elements that are present between group 3 elements and group 11 elements in a periodic table, and typical elements up to a third period in a periodic table). D50 according to volume-basis particle size distribution which is measured and obtained by a laser diffraction and scattering type particle size distribution measurement method (referred to as "D50") is more than 4 μm and less than 20 μm. In addition, a ratio of a primary particle area that is obtained by the following measurement method to a secondary particle area that is obtained by the following measurement method from secondary particles having a size corresponding to the D50 (referred to as "primary particle area/secondary particle area") is 0.004 to 0.035. In addition, the minimum value of powder crushing strength that is obtained by crushing a powder using a microcompression tester is more than 70 MPa.

(Method of Measuring Secondary Particle Area)

The method of measuring the secondary particle area includes observing a lithium metal compound oxide (powder) using an electron microscope, randomly selecting five secondary particles having a size corresponding to D50, calculating an area by setting a length of the secondary particles as a diameter (μm) in a case where the secondary particles are spherical, or calculating the area by carrying out approximation to a spherical shape in a case where the secondary particles have an indefinite shape, and obtaining an average value of the five areas as the secondary particle area (μm²).

(Method of Measuring Primary Particle Area)

The method of measuring the primary particle area includes observing a lithium metal compound oxide (powder) using an electron microscope, randomly selecting five secondary particles per one visual field, randomly selecting 10 primary particles from each of the five secondary particles that are selected, calculating an area by setting the longest portion of spacing between grain boundaries to a major axis (μm) and setting of the spacing between the grain boundaries in a case where the primary particles have a rod shape, or calculating the area by setting the length of the spacing between grain boundaries to a diameter (μm) in a case where the primary particles have a spherical shape, and obtaining an average value of the fifty areas as the primary particle area (μm²).

Advantageous Effects of Invention

When using the lithium metal compound oxide, which is suggested by the invention, as a positive electrode material of a lithium secondary battery, excellent characteristics can be exhibited in any of three characteristics, that is, charge-discharge cycle ability, charge and discharge efficiency of a first time, and slurry characteristics. Accordingly, particularly, the lithium metal compound oxide suggested by the invention is very excellent as a positive electrode active material of in-vehicle batteries, particularly, a battery that is mounted on an electric vehicle (EV) or a hybrid electric vehicle (HEV).

DESCRIPTION OF EMBODIMENTS

Figure 1:
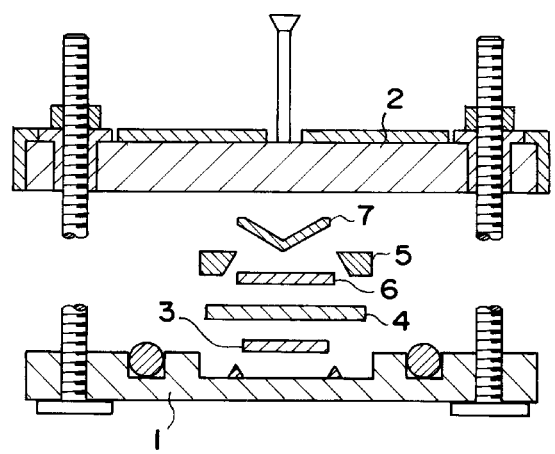
FIG. 1 is a diagram illustrating a configuration of a cell for electrochemical evaluation which is prepared with regard to battery characteristic evaluation of Examples.

Hereinafter, an embodiment of the invention will be described, but the invention is not limited to the following embodiment.

<Present Lithium Metal Compound Oxide>

A lithium metal compound oxide of this embodiment (hereinafter, referred to as "present lithium metal compound oxide") is a powder containing lithium metal compound oxide particles having a layered structure which is expressed by general formula (1): $Li_{1+x}M_{1-x}O_2$ as a main component. That is, the lithium metal compound oxide is a powder containing lithium metal compound oxide particles, which have a layered structure in which a lithium atom layer and a transition metal atom layer are alternately overlapped with an oxygen atom layer being interposed therebetween, as a main component.

In addition, "containing something as a main component" includes a configuration containing other components in a range not hindering a function of the main component unless otherwise stated. A contained ratio of the main component includes a case of occupying at least 50% by mass or more of the present lithium metal compound oxide, preferably 70% by mass or more, more preferably 90% by mass or more, and still more preferably 95% by mass or more (including 100%).

The present lithium metal compound oxide may contain 1.0% by weight or less of $SO_4$, and 0.5% by weight or less of other elements as impurities. This is because the characteristics of the present lithium metal compound oxide are hardly affected by impurities in such an amount.

In formula (1), "1+x" is preferably 1.00 to 1.07, more preferably 1.01 to 1.07, and still more preferably 1.02 to 1.06.

In formula (1), "M" may be any one or more kinds among Mn, Co, Ni, transition elements that are present between group 3 elements and group 11 elements in a periodic table, and typical elements up to a third period in a periodic table.

Here, examples of the transition elements that are present between group 3 elements and group 11 elements in a periodic table, and typical elements up to a third period in a periodic table include Al, V, Fe, Ti, Mg, Cr, Ga, In, Cu, Zn, Nb, Zr, Mo, W, Ta, Re, and the like.

For example, "M" may be one or more kinds among Mn, Co, Ni, Al, V, Fe, Ti, Mg, Cr, Ga, In, Cu, Zn, Nb, Zr, Mo, W, Ta, and Re, and may include only three elements of Mn, Co, and Ni. One or more kinds of other elements may be contained in addition to the three elements, and other configurations are also possible.

In formula (1), in a case where "M" contains the three elements of Mn, Co, and Ni, a content molar ratio of Mn, Co, and Ni is preferably Mn:Co:Ni=0.10 to 0.45:0.05 to 0.40: 0.30 to 0.75, and more preferably Mn:Co:Ni=0.10 to 0.40: 0.05 to 0.40:0.30 to 0.75.

For example, in a case of being expressed by general formula (2): $Li_{1+x}(Mn_\alpha Co_\beta Ni_\gamma)_{1-x}O_2$, the following ratio is preferable.

In formula (2), a value of α is preferably 0.10 to 0.45, more preferably 0.15 to 0.40, and still more preferably 0.20 to 0.35.

A value of β is preferably 0.05 to 0.40, more preferably 0.05 to 0.30, and still more preferably 0.05 to 0.25.

A value of γ is preferably 0.30 to 0.75, more preferably 0.40 to 0.65, and still more preferably 0.45 or more or 0.55.

In addition, in general formulae (1) and (2), an atomic ratio of the oxygen content is described as "2" for convenience, but may have slight non-stoichiometry.

(D50)

In the present lithium metal compound oxide, D50 according to volume-basis particle size distribution which is measured and obtained by a laser diffraction and scattering type particle size distribution measurement method is preferably more than 4 μm and less than 20 μm.

When D50 of the present lithium metal compound oxide is more than 4 μm, it is possible to prevent slurry viscosity from increasing due to agglomeration of particles, and when D50 is less than 20 μm, it is possible to prevent unevenness due to precipitation of particles during storage of the slurry. Accordingly, when D50 of the present lithium metal compound oxide is more than 4 μm and less than 20 μm, it is possible to enhance coating properties of slurry.

From the viewpoints, D50 of the present lithium metal compound oxide is more preferably 6 μm to 16 μm, still more preferably 13 μm or less, and further still more preferably 10 μm or less.

To adjust D50 of the present lithium metal compound oxide to the range, it is preferable to carry out adjustment of D50 of a starting raw material, adjustment of a firing temperature or a firing time, or adjustment of D50 by crushing after firing. However, it is not limited to the adjustment methods.

(Primary Particle Area/Secondary Particle Area)

In the present lithium metal compound oxide, a ratio of a primary particle area that is measured and obtained by the following measurement method to a secondary particle area that is measured and obtained by the following measurement method from secondary particles having a size corresponding to D50 according to volume-basis particle size distribution which is obtained by a laser diffraction and scattering type particle size distribution measurement method (referred to as "primary particle area/secondary particle area") is preferably 0.004 to 0.035.

When a primary particle area/secondary particle area is 0.035 or less, a surface area of the secondary particles that come into contact with an electrolytic solution is large, and incoming and outgoing of lithium ions can be smoothly carried out. Accordingly, it is possible to increase charge and discharge efficiency at the first cycle. On the other hand, when a primary particle area/secondary particle area is 0.004 or more, it is possible to decrease an interface between primary particles in the secondary particles. As a result, it is possible to decrease an internal resistance of the secondary particles, and thus it is possible to increase charge and discharge efficiency at the first cycle. Accordingly, in the above-described range, initial charge and discharge efficiency can be improved. However, in a case where D50 is 4 μm or less, it is confirmed that this tendency becomes different.

From these viewpoints, in the above-described range, the primary particle area/secondary particle area is more preferably 0.004 to 0.026, and still more preferably 0.006 to 0.017.

With regard to adjustment of primary particle area/secondary particle area of the present lithium metal compound oxide to the above-described range, for example, in a manufacturing method according to a spray dry method to be described later, the adjustment may be carried out by setting crushing strength in the pulverization after firing or a heat treatment to be higher than crushing strength in the related art so as to make D50 small and make "primary particle area/secondary particle area" large.

On the other hand, in a manufacturing method according a coprecipitation method to be described later, for example, the adjustment may be carried out by lowering a firing temperature, making a primary particle size of a coprecipitated powder small, or carrying out firing in a carbon dioxide atmosphere to make an average particle size of the primary particles small so as to decrease "primary particle area/secondary particle area".

However, it is not limited to these adjustment methods.

In addition, in the invention, "primary particle" represents a particle of the smallest unit which is constituted by a plurality of crystallites and which is surrounded by a grain boundary when being observed by a SEM (Scanning Electron Microscope, for example, at a magnification of 1000 times to 5000 times). Accordingly, the primary particle includes a single crystal and a polycrystal. At this time, "crystallite" represents the maximum assembly that may be regarded as a single crystal, and can be obtained by carrying out XRD measurement and Rietveld analysis.

"Primary particle area" represents a surface area of a primary particle on an electron microscope photograph. The primary particle area may be obtained as follows. A lithium metal compound oxide powder is observed using an electron microscope (for example, a magnification of 1000 times), and five secondary particles having a size corresponding to D50 are randomly selected for one visual field. The magnification is changed to 5000 times as necessary, and 10 primary particles are randomly selected from each of the five secondary particles that are selected. An area is calculated by setting the longest portion of spacing between grain boundaries to a major axis (μm) and setting spacing between grain boundaries in a case where the primary particles have a rod shape, or by setting the length of the spacing between the grain boundaries to a diameter (μm) in a case where the primary particles have a spherical shape, and an average value of the fifty areas may be obtained as the primary particle area ($\mu m^2$).

At this time, the primary particle area may be calculated from a primary particle image of an electron microscope photograph using image analysis software.

On the other hand, in the invention, "secondary particle" or "agglomerated particle" represents a particle in which several primary particles are agglomerated to share a part of the periphery (grain boundary) thereof, and which is isolated from other particles.

"Secondary particle area" represents a planar area of a secondary particle on the electron microscope photograph. For example, the secondary particle area may be obtained as follows. A lithium metal compound oxide powder is observed using an electron microscope (for example, a magnification of 1000 times), and five secondary particles having a size corresponding to D50 is randomly selected. An area is calculated by setting a length of spacing between grain boundaries as a diameter (μm) in a case where the secondary particles have a spherical shape, or by carrying out approximation to a spherical shape in a case where the secondary particles have an indefinite shape. An average value of five areas is obtained as the secondary particle area ($\mu m^2$).

In addition, the laser diffraction and scattering type particle size distribution measurement method is a measuring method of calculating a particle size by regarding agglomerated particles as one particle (agglomerated particle). D50 according to volume-basis particle size distribution which is measured and obtained by the measuring method represents 50% volume accumulated particle size, that is, a diameter of accumulated 50% from details of percentage expression about a measured value of a particle size in terms of volume in a volume-basis particle size distribution chart.

(Primary Particle Area)

The primary particle area of the present lithium metal compound oxide powder is not particularly limited as long as primary particle area/secondary particle area is in the above-described range. As a standard of the primary particle area of the present lithium metal compound oxide powder, 0.002 $\mu m^2$ to 13.0 $\mu m^2$ is preferable, 0.007 $\mu m^2$ to 13.0 $\mu m^2$ is more preferable, and 0.2 $\mu m^2$ to 4.0 $\mu m^2$ is still more preferable.

The primary particle area of the present lithium metal compound oxide powder may be adjusted by selection of a raw material crystalline state, firing conditions, and the like.

However, it is not limited to the adjustment method.

(Powder Crushing Strength)

In the present lithium metal compound oxide powder, it is preferable that the minimum value of powder crushing strength obtained by crushing the powder using a microcompression tester be more than 70 MPa.

When the minimum value of the powder crushing strength of the present lithium metal compound oxide powder is more than 70 MPa, in a case of using the powder as a positive electrode material of a lithium secondary battery, collapse of particles can be suppressed even when expansion and contraction of a positive electrode active material occur during charge and discharge of the lithium secondary battery. As a result, it is possible to raise capacity retention rate during a particularly high temperature cycle.

From the viewpoints, the minimum value of the powder crushing strength of the present lithium metal compound oxide powder is preferably more than 70 MPa, and more preferably 75 MPa or more.

To adjust the minimum value of the powder crushing strength of the present lithium metal compound oxide powder to the above-described range, for example, in a manufacturing method according to a spray dry method to be described later, crushing after firing or a heat treatment is further reinforced compared to the related art so as to make D50 small and to make "primary particle area/secondary particle area" large, whereby it is possible to make the minimum value of the powder crushing strength more than 70 MPa.

On the other hand, in a manufacturing method according a coprecipitation method to be described later, for example, a firing temperature is lowered, an average particle size of primary particles of a coprecipitated powder is made small, or firing is carried out in a carbon dioxide atmosphere compared to the related art so as to make an average particle size of the primary particles small and to decrease "primary particle area/secondary particle area", whereby it is possible to make the minimum value of the powder crushing strength more than 70 MPa.

However, it is not limited to these adjustment methods.

(Manufacturing Method)

Next, a method of manufacturing the present lithium metal compound oxide powder will be described.

For example, the present lithium metal compound oxide powder may be obtained as follows. Raw materials such as lithium salt compound, a manganese salt compound, a nickel salt compound, and a cobalt salt compound are weighed and are mixed in. The resultant mixture is pulverized using a wet type pulverizer or the like, and the resultant pulverized mixture is granulated. Then, firing is carried out, and a heat treatment is carried out as necessary. Then, crushing is carried out under preferred conditions, and classification is carried out as necessary.

Examples of the lithium salt compound that is a raw material include lithium hydroxide (LiOH), lithium carbonate ($Li_2CO_3$), lithium nitrate ($LiNO_3$), $LiOH.H_2O$, lithium oxide ($Li_2O$), fatty acid lithium, lithium halide, and the like. Among these, lithium hydroxide, lithium carbonate, and lithium nitrate are preferable.

A kind of the manganese salt compound is not particularly limited. For example, manganese carbonate, manganese nitrate, manganese chloride, manganese dioxide, and the like may be used. Among these, manganese carbonate and manganese dioxide are preferable, and electrolytic manganese dioxide that is obtained according to an electrolytic method is more preferable.

A kind of the nickel salt compound is also not particularly limited. For example, nickel carbonate, nickel nitrate, nickel chloride, nickel oxyhydroxide, nickel hydroxide, nickel oxide, and the like may be used. Among these, nickel carbonate, nickel hydroxide, and nickel oxide are preferable.

A kind of the cobalt salt compound is also not particularly limited. For example, basic cobalt carbonate, cobalt nitrate, cobalt chloride, cobalt oxyhydroxide, cobalt hydroxide, cobalt oxide, and the like may be used. Among these, basic cobalt carbonate, cobalt hydroxide, cobalt oxide, and cobalt oxyhydroxide are preferable.

With regard to mixing of the raw materials, it is preferable to carry out wet-type mixing by adding a liquid medium such as water and a dispersant so as to obtain slurry. In addition, in a case of employing a spray dry method to be described later, it is preferable to pulverize the obtained slurry using a wet-type pulverizer. However, dry-type pulverization may also be carried out.

As a granulation method, a wet type or a dry type is possible as long as various kinds of raw materials that are pulverized in a previous process are dispersed in granulated particles without being separated. In addition, the granulation method may be an extrusion granulation method, a rolling granulation method, a fluidized bed granulation method, a mixing granulation method, a spray dry granulation method, a compression molding granulation method, or a flake granulation method using roll or the like. However, in the case of carrying the wet-type granulation, it is necessary to sufficiently carry out drying before firing. Examples of a drying method include various known dry methods in the related art such as a spray thermal dry method, a hot-air dry method, a vacuum dry method, and a freeze-dry method. Among these, the spray thermal dry method is preferable. The spray thermal dry method is preferably carried out using a thermal spray drier (spray drier) (in this specification, referred to as "spray dry method").

However, for example, a coprecipitated powder that is provided for firing may be prepared according to a so-called coprecipitation method (in this specification, referred to as "coprecipitation method"). In the coprecipitation method, raw materials are dissolved in a solution, and conditions such as pH are adjusted to allow the dissolved raw materials to precipitate, whereby a coprecipitated powder may be obtained.

In addition, in the spray dry method, powder strength is relatively low, and a void tends to occur between particles. Therefore, in the case of employing the spray dry method, crushing strength is further raised compared to a pulverization method in the related art, for example, a crushing method using a coarse pulverizer with the number of revolutions of approximately 1000 rpm. For example, it is preferable to raise crushing strength by crushing using a high-speed rotary pulverizer or the like so as to further increase primary particle area/secondary particle area of the present lithium metal compound oxide powder compared to a lithium metal compound oxide powder obtained by a typical spray dry method in the related art, thereby adjusting primary particle area/secondary particle area to a range specified in the invention.

On the other hand, in the coprecipitation method, primary particles are enlarged, and thus primary particle area/secondary particle area tends to increase. Therefore, in the case of employing the coprecipitation method, it is preferable to make an average particle size of the primary particles small so as to decrease primary particle area/secondary particle area by lowering a firing temperature, shortening a firing time, making the primary particle size of a coprecipitated powder small, or carrying out firing in a carbon dioxide atmosphere compared to a general precipitation method in the related art, thereby adjusting primary particle area/secondary particle area in a range specified in the invention.

It is preferable to carry out the firing in a firing furnace under an atmospheric atmosphere, an oxygen gas atmosphere, an atmosphere in which an oxygen partial pressure is adjusted, a carbon dioxide gas atmosphere, or other atmospheres at a temperature higher than 800° C. and lower than 1000° C. (represents a temperature in a case of bringing a thermocouple into contact with a fired product inside a firing furnace), preferably 810° C. to 1000° C., and more preferably 810° C. to 950° C. for a retention time of 0.5 hours to 30 hours. At this time, it is preferable to select firing conditions in which a transition metal is present as a solid solution in an atomic level, and a single phase is exhibited.

A kind of the firing furnace is not particularly limited. For example, the firing may be carried out using a rotary kiln, a stationary kiln, and other firing furnaces.

It is preferable to carry out the heat treatment after the firing in a case where adjustment of a crystal structure is necessary, and the heat treatment may be carried out under oxidizing atmosphere conditions such as an atmospheric atmosphere, an oxygen gas atmosphere, and an atmosphere in which an oxygen partial pressure is adjusted.

With regard to the crushing after the firing or the heat treatment, it is preferable to carry out the crushing using a high speed rotary pulverizer and the like as described above. When the crushing is carried out using the high speed rotary pulverizer, it is possible to crush a portion in which particles are agglomerated, or sintering is weak, and thus introduction of a strain into particles can be suppressed. However, it is not limited to the high speed rotary pulverizer.

Examples of the high speed rotary pulverizer include a pin mill. The pin mill is known as a disk rotary type pulverizer, and is a crusher of the following type. A rotary disk to which a pin is attached rotates, whereby the inside is set to a negative pressure, and thus a powder is sucked in from a raw material supply port. Accordingly, fine particles have a light weight, and thus the fine particles tend to ride an air current and pass through a clearance in the pin mill. On the other hand, coarse particles are reliably crushed. As a result, according to the pin mill, it is possible to reliably loosen agglomeration between particles or a weakly sintered portion, and it is possible to prevent a strain from being introduced into the inside of the particles.

It is preferable that the number of revolutions of the high speed rotary pulverizer be set to 4000 rpm or more, more preferably 5000 rpm to 12000 rpm, and still more preferably 7000 rpm to 10000 rpm.

The classification after the firing has a technical meaning for adjustment of a particle size distribution of agglomerated powders and removal of foreign substances, and thus it is preferable to carry out the classification by selecting a sieve having an aperture of a preferable size.

(Characteristic and Use)

The present lithium metal compound oxide powder can be effectively used as a positive electrode active material of a lithium battery after being crushed and classified as necessary.

For example, the present lithium metal compound oxide powder, an electrically conductive material formed from carbon black and the like, and a binder including a Teflon (Teflon is a registered trademark of DUPONT in USA) binder and the like are mixed-in to prepare a positive electrode mixture. In addition, the lithium secondary battery may be configured in such a manner that the positive electrode mixture is used for a positive electrode, for example, a material such as lithium and carbon capable of intercalating and deintercalating lithium is used as a negative electrode, and a material obtained by dissolving a lithium salt such as lithium hexafluorophosphate (LiPF$_6$) in a mixed solvent such as ethylene carbonate-dimethyl carbonate is used as a nonaqueous electrolyte. However, it is not limited to the battery having the configuration.

The lithium battery provided with the lithium metal compound oxide powder as a positive electrode active material exhibits excellent charge-discharge cycle ability (cycle characteristics) when being used by repeating charge and discharge, and thus the lithium battery is particularly excellent for a use of a positive electrode active material of a lithium battery that is used as a power supply for driving a motor mounted on, particularly, an electric vehicle (EV) or a hybrid electric vehicle (HEV).

In addition, the "hybrid vehicle" represents a vehicle using two power sources including an electric motor and a combustion engine in combination.

In addition, the "lithium battery" represents all kinds of batteries such as a lithium primary battery, a lithium secondary battery, a lithium ion secondary battery, and a lithium polymer battery which contain lithium or lithium ions in a battery.

<Description of Phrase>

In this specification, in the case of expressing "X to Y" (X and Y represent an arbitrary number), this expression also includes meaning of "preferably more than X" or "preferably less than Y" together with meaning of "equal to or more than X and equal to or less than Y" unless otherwise noted.

In addition, in the case of expressing "X or more" (X represents an arbitrary number) or "Y or less" (Y represents an arbitrary number), this expression also includes intension of "preferably more than X" or "preferably less than Y".

EXAMPLES

Next, the invention will be described in more detail on the basis of Examples and Comparative Examples, but the invention is not limited to the following Examples.

Example 1

First, sodium hydroxide and ammonia were supplied to an aqueous solution in which nickel sulfate, cobalt sulfate, and manganese sulfate were dissolved to prepare a metal compound hydroxide in which a molar ratio between nickel, cobalt, and manganese was 0.54:0.19:0.27 according to the coprecipitation method.

The metal compound hydroxide that was prepared in this manner was composed of spherical secondary particles in which a plurality of primary particles of 1 μm or less were agglomerated, and D50 of the metal compound hydroxide that was obtained was 15 μm, and a tap density was 2.2 g/cm$^3$.

Next, lithium carbonate and metal compound hydroxide were weighed in such a manner that a ratio between the number of moles of Li and the total number of moles of metals (Ni, Co, and Mn) other than Li became 1.04:0.96, and were sufficiently mixed using a ball mill. A mixed powder that was obtained was fired using a stationary electric furnace at 910° C. for 20 hours.

A fired ingot that was obtained by the firing was put into a mortar and was crushed with a pestle. Then, a sieved article classified with a sieve having a sieve aperture of 5 mm was crushed by a high speed rotary pulverizer (pin mill, manufactured by Makino mfg. Co., Ltd.) (crushing conditions: the number of revolutions was 10000 rpm), and then the resultant crushed article was classified with a sieve having an aperture of 53 μm to collect a sieved lithium transition metal oxide powder (sample).

After carrying out chemical analysis with respect to the lithium transition metal oxide powder (sample) that was collected, a composition of $Li_{1.04}Ni_{0.52}Co_{0.19}Mn_{0.25}O_2$ was found.

Example 2

A ammonium polycarboxylate dispersant (SN dispersant 5468, manufactured by SAN NOPCO LIMITED) was added to ion exchanged water in such a manner that a dispersant in slurry became 6% by weight of solid content, and the ammonium polycarboxylate was sufficiently dissolved and mixed in the ion exchanged water.

Lithium carbonate having D50 of 7 μm, electrolytic manganese dioxide having D50 of 23 μm and a specific surface area of 40 m$^2$/g, cobalt oxyhydroxide having D50 of 14 μm, and nickel hydroxide having D50 of 22 μm were weighed in a molar ratio of Li:Mn:Ni:Co=1.04:0.26:0.51:0.19, and the above-described metal salts were mixed and stirred in the above-described ion exchanged water in which the dispersant was dissolved in advance in this order to prepare slurry having a solid content concentration of 50% by weight. The slurry was pulverized by a wet-type pulverizer at 1300 rpm for 40 minutes to set D50 to 0.5 μm.

The pulverized slurry that was obtained was granulated and dried using a thermal spray drier (spray drier i-8, manufactured by OHKAWARA KAKOHKI CO., LTD.). At this time, a rotary disk was used for spraying. The granulation and drying were carried out under conditions in which the number of revolutions was set to 24000 rpm, a slurry supply amount was set to 3 kg/hr, and a temperature was adjusted in such a manner that an outlet temperature of a drying tower became 100° C.

A granulated powder that was obtained was calcinated using a stationary electric furnace in the air at 450° C. Continuously, a resultant calcinated powder was fired using a stationary electric furnace at 910° C. for 20 hours.

A fired ingot that was obtained by the firing was put into a mortar and was crushed with a pestle. Then, a sieved article classified with a sieve having a sieve aperture of 5 mm was crushed by a high speed rotary pulverizer (pin mill, manufactured by Makino mfg. Co., Ltd.) (crushing conditions: the number of revolutions was 10000 rpm), and then the resultant crushed article was classified with a sieve having an aperture of 53 μm to collect a sieved lithium transition metal oxide powder (sample).

After carrying out chemical analysis with respect to the lithium transition metal oxide powder (sample) that was collected, a composition of $Li_{1.04}Ni_{0.52}Co_{0.19}Mn_{0.25}O_2$ was found.

Comparative Example 1

A ammonium polycarboxylate dispersant (SN dispersant 5468, manufactured by SAN NOPCO LIMITED) was added to ion exchanged water in such a manner that a dispersant in slurry became 6% by weight of solid content, and the ammonium polycarboxylate was sufficiently dissolved and mixed in the ion exchanged water.

Lithium carbonate having D50 of 7 μm, electrolytic manganese dioxide having D50 of 23 μm and a specific surface area of 40 m$^2$/g, cobalt oxyhydroxide having D50 of 14 μm, and nickel hydroxide having D50 of 22 μm were weighed in a molar ratio of Li:Mn:Ni:Co=1.04:0.26:0.51: 0.19, and the above-described metal salts were mixed and stirred in the above-described ion exchanged water in which the dispersant was dissolved in advance in this order to prepare slurry having a solid content concentration of 50% by weight. The slurry was pulverized by a wet-type pulverizer at 1300 rpm for 40 minutes to set D50 to 0.5 μm.

The pulverized slurry that was obtained was granulated and dried using a thermal spray drier (spray drier i-8, manufactured by OHKAWARA KAKOHKI CO., LTD.). At this time, a rotary disk was used for spraying. The granulation and drying were carried out under conditions in which the number of revolutions was set to 24000 rpm, a slurry supply amount was set to 3 kg/hr, and a temperature was adjusted in such a manner that an outlet temperature of a drying tower became 100° C.

A granulated powder that was obtained was calcinated using a stationary electric furnace in the air at 450° C. Continuously, the resultant calcinated powder was fired using a stationary electric furnace at 910° C. for 20 hours.

A fired ingot that was obtained by the firing was put into a mortar and was crushed with a pestle, and was classified with a sieve having an aperture of 53 μm to collect a sieved compound oxide powder (sample).

The collected sample was pulverized by carrying out pulverization using a classification mechanism-attached collision type pulverizer (counter jet mill "100 AFG/50 ATP", manufactured by Hosokawa Micron Ltd.) under conditions in which the number of revolutions of a classifying rotor was set to 14900 rpm, a pulverizing air pressure was set to 0.6 MPa, three pulverizing nozzles having φ of 2.5 were used, and a powder supply amount was set to 4.5 kg/h to obtain a lithium transition metal oxide powder (sample).

After carrying out chemical analysis with respect to the lithium transition metal oxide powder (sample) that was obtained, a composition of $Li_{1.04}Ni_{0.52}Co_{0.19}Mn_{0.25}O_2$ was found.

Comparative Example 2

A ammonium polycarboxylate dispersant (SN dispersant 5468, manufactured by SAN NOPCO LIMITED) was added to ion exchanged water in such a manner that a dispersant in slurry became 6% by weight of solid content, and the ammonium polycarboxylate was sufficiently dissolved and mixed in the ion exchanged water.

Lithium carbonate having D50 of 8 μm, electrolytic manganese dioxide having D50 of 23 μm and a specific surface area of 40 m$^2$/g, cobalt oxyhydroxide having D50 of 14 μm, and nickel hydroxide having D50 of 22 μm were weighed in a molar ratio of Li:Mn:Ni:Co=1.04:0.26:0.51: 0.19, and the above-described metal salts were mixed and stirred in the above-described ion exchanged water in which the dispersant was dissolved in advance in this order to prepare slurry having a solid content concentration of 50% by weight. The slurry was pulverized by a wet-type pulverizer at 1300 rpm for 40 minutes to set D50 to 0.5 μm.

The pulverized slurry that was obtained was granulated and dried using a thermal spray drier (spray drier i-8, manufactured by OHKAWARA KAKOHKI CO., LTD.). At this time, a rotary disk was used for spraying. The granulation and drying were carried out under conditions in which the number of revolutions was set to 24000 rpm, a slurry supply amount was set to 3 kg/hr, and a temperature was adjusted in such a manner that an outlet temperature of a drying tower became 100° C.

A granulated powder that was obtained was calcinated using a stationary electric furnace in the air at 450° C. Continuously, the resultant calcinated powder was fired using a stationary electric furnace at 910° C. for 20 hours.

A fired ingot that was obtained by the firing was put into a mortar and was crushed with a pestle, and was classified with a sieve having an aperture of 53 μm to collect a sieved lithium transition metal oxide powder (sample).

After carrying out chemical analysis with respect to the lithium transition metal oxide powder (sample) that was collected, a composition of $Li_{1.04}Ni_{0.52}Co_{0.19}Mn_{0.25}O_2$ was found.

Comparative Example 3

First, sodium hydroxide and ammonia were supplied to an aqueous solution in which nickel sulfate, cobalt sulfate, and manganese sulfate were dissolved to prepare a metal compound hydroxide in which nickel, cobalt, and manganese were present in a solid solution in a molar ratio of 0.54: 0.19:0.27 according to the coprecipitation method. The metal compound hydroxide was composed of spherical secondary particles in which a plurality of primary particles of 1 μm or less were agglomerated, and D50 of the metal compound hydroxide that was obtained was 15 μm, and a tap density was 2.2 g/cm$^3$.

Lithium carbonate and metal compound hydroxide were weighed in such a manner that a ratio between the number of moles of Li and the total number of moles of metals (Ni, Co, and Mn) other than Li became 1.07:0.93, and were sufficiently mixed using a ball mill. A mixed powder that was obtained was fired using a stationary electric furnace at 960° C. for 20 hours while allowing air to flow.

A fired powder that was obtained by the firing was put into a mortar and was crushed with a pestle, and was classified with a sieve having an aperture of 53 μm to collect a sieved lithium transition metal oxide powder (sample).

After carrying out chemical analysis with respect to the lithium transition metal oxide powder (sample) that was collected, a composition of $Li_{1.07}Ni_{0.51}Co_{0.18}Mn_{0.24}O_2$ was found.

<Measurement of Primary Particle Area>

The primary particle area of the lithium transition metal oxide powders (samples) which were obtained in Examples and Comparative Examples was measured as follows. Each of the samples (powders) was observed using a SEM (Scanning Electron Microscope) at a magnification of 1000 times, and five secondary particles having a size corresponding to D50 were randomly selected for one visual field. Then, the magnification was changed to 5000 times and 10 primary particles were randomly selected from each of the five secondary particles that were selected. In a case where the primary particles had a rod shape, an area was calculated by setting the longest portion of spacing between grain boundaries to a major axis (μm) and setting of the spacing between the grain boundaries. In a case where the primary particles had a spherical shape, the area was calculated by setting spacing between gran boundaries to a diameter (μm). An average value of the fifty areas was obtained as the primary particle area ($μm^2$).

In addition, the primary particle area that was obtained in this manner was indicated as "primary particle area" in Table and Graph.

<Measurement of D50>

With respect to the lithium transition metal oxide powders (samples) that were obtained in Examples and Comparative Examples, D50 was obtained as follows. Each of the samples (powders) was put into an aqueous solvent using an automatic sample supply machine for a laser diffraction particle size distribution measuring device ("Microtorac SDC", manufactured by NIKKISO CO., LTD), and the sample was irradiated with ultrasonic waves of 40 W at a flow rate of 40% for 360 seconds. Then, a particle size distribution was measured using a laser diffraction particle size distribution measuring machine "MT3000II" manufactured by NIKKISO CO., LTD. D50 was obtained from a volume-basis particle size distribution chart that was obtained.

In addition, an aqueous solvent during measurement was allowed to pass through a filter of 60 μm, a refractive index of the solvent was set to 1.33, a condition of particle permeability was set to permeation, a refractive index of particles was set to 2.46, a shape was set to a non-spherical shape, a measurement range was set to 0.133 μm to 704.0 μm, and a measurement time was set to 30 seconds. An average value of values obtained by carrying out measurement twice was set to D50.

<Measurement of Secondary Particle Area>

Each of the samples (powders) was observed using a SEM (Scanning Electron Microscope) at a magnification of 1000 times. Five secondary particles having a size corresponding to D50 obtained in the above-described measurement were randomly selected. In a case where the secondary particles had a spherical shape, an area was calculated by setting a length of spacing between grain boundaries as a diameter (μm). In a case where the secondary particles had an indefinite shape, the area was calculated by carrying out approximation to a spherical shape. An average value of five areas was obtained as the secondary particle area ($μm^2$).

<Measurement of Powder Crushing Strength>

With respect to the lithium transition metal oxide powders (samples) obtained in Examples and Comparative Examples, measurement of the crushing strength (MPa) of the respective secondary particles of D50±2 μm according to the volume-basis particle size distribution was carried out using a microcompression tester (manufactured by Shimadzu Corporation) to obtain 10 measurement values. The minimum value among the 10 measurement values was set as the minimum value (MPa) of the particle crushing strength.

<Method of Evaluating Shear Stress and Slurry Viscosity>

8.0 g of each of the lithium transition metal oxide powders (samples) obtained in Examples and Comparative Examples, 0.6 g of acetylene black (manufactured by DENKI KAGAKU KOGYO KABUSHIKI KAISHA), and 5 g of a solution obtained by dissolving 12% by weight of PVDF (manufactured by Kishida Chemical Co., Ltd.) in NMP (N-methyl pyrrolidone) were accurately weighed and collected. In addition, 6 ml of NMP was added to the resultant mixture, and the mixture was sufficiently mixed to prepare slurry.

The slurry prepared as described above was evaluated using a slurry evaluating device RheoStress 600 (manufactured by Thermo HAAKE Corporation). That is, the slurry was placed between two sheets of upper and lower plates, the upper portion was allowed to rotate, the number of revolutions was continuously raised, and a shear stress [Pa] and slurry viscosity [Pas] when the shear speed reached 1000 [1/s] were measured for each of the samples.

In addition, in Table 1, each of the shear stress and the slurry viscosity of the respective Examples and Comparative Examples is shown as a relative value in a case of setting a value of Comparative Example 2 to 100

<Battery Characteristic Evaluation>

8.0 g of each of the lithium transition metal oxide powders (samples) obtained in Examples and Comparative Examples, 1.0 g of acetylene black (manufactured by DENKI KAGAKU KOGYO KABUSHIKI KAISHA), and 8.3 g of a solution obtained by dissolving 12% by weight of PVDF (manufactured by Kishida Chemical Co., Ltd.) in NMP (N-methyl pyrrolidone) were accurately weighed and collected. In addition, 5 ml of NMP was added to the resultant mixture, and the mixture was sufficiently mixed to prepare paste. The paste was placed on aluminum foil that was a current collector, and was formed into a film using an applicator in which a gap was adjusted to 100 μm to 280 μm. Then the film was vacuum-dried at 140° C. for a whole day and night. Then, the resultant laminated body was punched to φ of 16 mm and was compressed at 4 t/$cm^2$ in a thickness direction. The resultant laminated body was set as a positive electrode.

Immediately before manufacturing a battery, the positive electrode was vacuum-dried at 120° C. for 120 minutes or longer to remove adhered moisture, and was assembled into the battery. In addition, an average value of the weight of the aluminum foil having φ of 16 mm was obtained in advance, and the weight of a positive electrode mixture was obtained by subtracting the weight of the aluminum foil from the weight of the positive electrode. In addition, the content of the positive electrode active material was obtained from a mixing ratio of the lithium transition metal oxide powder (positive electrode active material), the acetylene black, and the PVDF.

A cell TOMCEL (registered trademark) for electrochemical evaluation which is shown in FIG. 1 was prepared as follows. As a negative electrode, metal Li having ϕ 19 mm×0.5 mm thickness was used. With regard to an electrolytic solution, a solution obtained by mixing EC and DMC in a volume ratio of 3:7 was used as a solvent, and 1 mol/L of $LiPF_6$ as a solute was dissolved in the solvent. The resultant solution was used as the electrolytic solution.

(Charge and Discharge Efficiency of First Cycle)

Charge and discharge efficiency of first cycle was obtained using the electrochemical cell that was prepared as described above according to the following method. That is, capacity when being constant-current and constant-potential charged at 25° C. with 0.1 C for 15 hours up to 4.3 V from the content of the positive electrode active material in the positive electrode was set as charge capacity (mAh/g). Capacity when being constant-current discharged with 0.1 C up to 3.0 V was set as discharge capacity (mAh/g). A ratio of the discharge capacity to the charge capacity was set as charge and discharge efficiency (%) of first cycle.

(High-Temperature Cycle Life Evaluation: 60° C. High-Temperature Cycle Characteristic)

A charge and discharge test was carried out using the electrochemical cell after being subjected to evaluation for initial charge and discharge efficiency as described above according to the following method to evaluate the high-temperature cycle life characteristics.

Preparation for charge and discharge was carried out as follows. The cell was put into an environmental tester in which an environmental temperature for battery charge and discharge was set to 60° C. and was prepared for charge and discharge. Then, the cell was left for 4 hours in order for a cell temperature to reach the environmental temperature, and then a charge and discharge range was set to 3.0 V to 4.3 V. Charge and discharge of a first cycle were carried out in such a manner that charge was carried out with 0.1 C constant-current and constant-potential, and discharge was carried out with 0.1 C constant-current. Then, charge and discharge cycle with 1 C was carried out 30 times.

The percentage (%) of a numerical value obtained by dividing discharge capacity at $31^{st}$ cycle by discharge capacity at $2^{nd}$ cycle was obtained as a high-temperature cycle life characteristic value.

In Table 1, high-temperature cycle life characteristic values of respective Examples and Comparative Examples are shown as a relative value in a case of setting a high-temperature cycle life characteristic value of Comparative Example 1 to 100.

(Observation)

Figure 3:
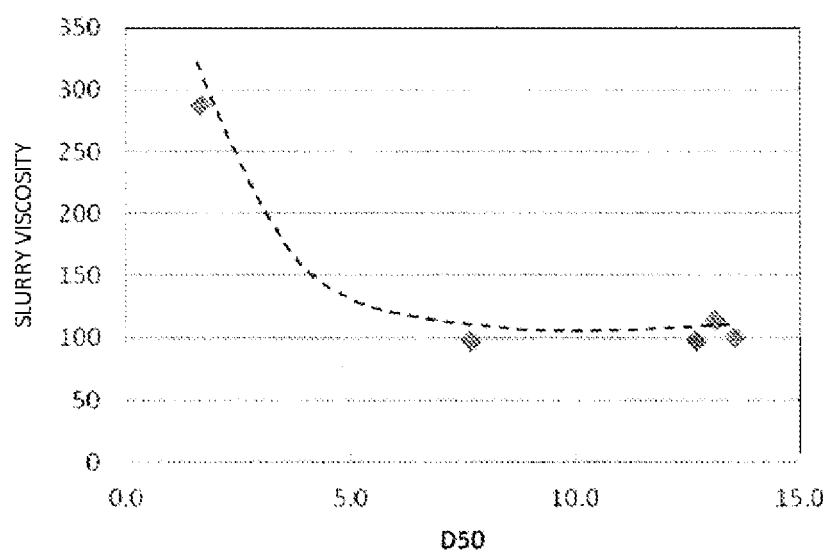
FIG. 3 is a graph illustrating a relation between D50 (μm) and slurry viscosity (relative index) as results of Examples and Comparative Examples.

From results of Table 1 and FIG. 3, and the like, it could be seen that in the present lithium metal compound oxide, when D50 was more than 4 μm, an increase in the slurry viscosity due to agglomeration of particles could be effectively prevented, and when D50 was 6 μm or more, it was more effective.

On the other hand, it also could be seen that when D50 was 10 μm or more, the effect was similar in consideration of the slurry viscosity, but when D50 increased too much, particles precipitated during storage of the slurry, the slurry became non-uniform, and thus D50 was preferably less than 20 μm.

In addition, from results of Table 1, and the like, in the present lithium metal compound oxide, it could be seen that when a primary particle area/secondary particle area was 0.035 μm² or less, the charge and discharge efficiency at the first cycle could be raised. The reason of this is considered as follows. When a primary particle area/secondary particle area is 0.035 μm² or less, a surface area of the secondary particles that come into contact with an electrolytic solution increases, and thus incoming and outgoing of lithium ions can be smoothly carried out. Accordingly, it is possible to increase charge and discharge efficiency at the first cycle. On the other hand, it could be seen that when a primary particle area/secondary particle area was 0.004 μm² or more, the charge and discharge efficiency at the first cycle could be raised. The reason of this is considered as follows. When a primary particle area/secondary particle area is 0.004 μm² or more, an interface between primary particles in the secondary particles decreases. As a result thereof, an internal resistance of the secondary particles can be lowered, and thus the charge and discharge efficiency at the first cycle can be raised.

Figure 2:
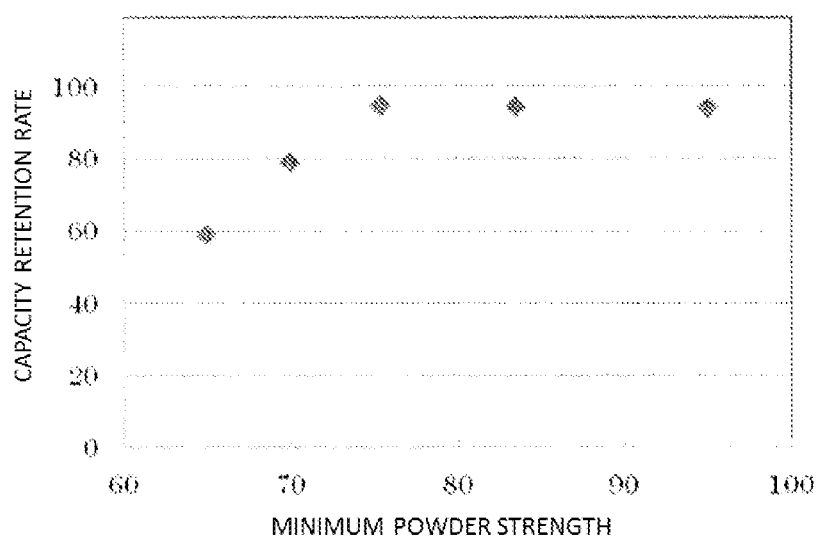
FIG. 2 is a graph illustrating a relation between minimum powder strength (MPa) and a capacity retention rate (%) as results of Examples and Comparative Examples.

Further, from the results of Table 1 and FIG. 2, and the like, it could be seen that in the present lithium metal compound oxide, when the minimum value of the powder crushing strength was more than 70 MPa, and preferably 75 MPa or more, a capacity retention rate at the high-temperature cycle could be effectively raised. The reason of this effect is considered as follows. When the minimum value of the powder crushing strength was more than 70 MPa, in a case of using the powder as a positive electrode material of a lithium secondary battery, collapse of particles can be suppressed even when expansion and contraction of the positive electrode active material occur during charge and discharge of the lithium secondary battery. However, it also could be seen that when the minimum value of the powder

TABLE 1

| | Primary particle area (μm²) | D50 (μm) | Primary particle area/secondary particle area | Minimum value of powder strength (MPa) | Shear stress | Slurry viscosity | Initial charge and discharge efficiency Negative electrode: Li/Li⁺ (%) | 60° C. high-temperature evaluation (negative electrode: Li) Capacity retention rate before and after 30 cycles |
|---|---|---|---|---|---|---|---|---|
| Example 1 | 0.8 | 12.7 | 0.006 | 84 | 98 | 97 | 87.7 | 101 |
| Example 2 | 0.6 | 7.7 | 0.014 | 75 | 97 | 97 | 89.2 | 101 |
| Comparative Example 1 | 0.6 | 1.7 | 0.289 | 95 | 290 | 288 | 90.0 | 100 |
| Comparative Example 2 | 0.6 | 15.5 | 0.003 | 70 | 100 | 100 | 87.6 | 84 |
| Comparative Example 3 | 5.8 | 13.1 | 0.043 | 65 | 114 | 114 | 83.7 | 63 | crushing strength became 94 MPa or more, the capacity retention rate did not vary, and thus when the minimum value of the powder crushing strength was 100 MPa or more, it was sufficiently good in consideration of the capacity retention rate after 30 cycles.

In addition, the above-described Examples relates to lithium metal compound oxides expressed by general formula $Li_{1+x}M_{1-x}O_2$ (M includes Mn, Co, and Ni), but the effect of the invention is largely affected by physical properties of a powder. Accordingly, it can be considered that the same is also true of a lithium metal compound oxide expressed by general formula $Li_{1+x}M_{1-x}O_2$ (M represents any one or more kinds among Mn, Co, Ni, Al, V, Fe, Ti, Mg, Cr, Ga, In, Cu, Zn, Nb, Zr, Mo, W, Ta, and Re) as long as the lithium metal compound oxide has a layered structure.

The invention claimed is:

1. A lithium metal compound oxide having a layered structure, which is expressed by general formula of $Li_{1+x}M_{1-x}O_2$ (M represents any one or more kinds among Mn, Co, Ni, transition elements that are present between group 3 elements and group 11 elements in a periodic table, and typical elements up to a third period in a periodic table), wherein 1+x=1.00 to 1.07 and a content molar ratio of Mn is 0.35 or less, a content molar ratio of Co is 0.05 to 0.40, and a content molar ratio of Ni is 0.45 or more,
   wherein D50 according to volume-basis particle size distribution which is measured and obtained by a laser diffraction and scattering type particle size distribution measurement method (referred to as "D50") is more than 4 μm and less than 20 μm,
   a ratio of a primary particle area that is obtained by the following measurement method to a secondary particle area that is obtained by the following measurement method from secondary particles having a size corresponding to the D50 (referred to as "primary particle area/secondary particle area") is 0.004 to 0.035, and
   the minimum value of powder crushing strength that is obtained by crushing a powder using a microcompression tester is more than 70 MPa,
   wherein the method of measuring the secondary particle area includes,
   observing a lithium metal compound oxide using an electron microscope,
   randomly selecting five secondary particles having a size corresponding to D50,
   calculating an area by setting a length of the secondary particles as a diameter (μm) in a case where the secondary particles have a spherical shape, or calculating the area by carrying out approximation to a spherical shape in a case where the secondary particles have an indefinite shape, and
   obtaining an average value of the five areas as the secondary particle area (μm²), and
   wherein the method of measuring the primary particle area includes,
   observing a lithium metal compound oxide using an electron microscope,
   randomly selecting five secondary particles per one visual field,
   randomly selecting 10 primary particles from each of the five secondary particles that are selected,
   calculating an area by setting the longest portion of spacing between grain boundaries to a major axis (μm) and setting of spacing between grain boundaries in a case where the primary particles have a rod shape, or calculating the area by setting the length of the spacing between the grain boundaries to a diameter (μm) in a case where the primary particles have a spherical shape, and
   obtaining an average value of the fifty areas as the primary particle area (μm²).

2. The lithium metal compound oxide according to claim 1,
   wherein the lithium metal compound oxide is expressed by general formula of $Li_{1+x}M_{1-x}O_2$ (M represents any one or more kinds among Mn, Co, Ni, Al, V, Fe, Ti, Mg, Cr, Ga, In, Cu, Zn, Nb, Zr, Mo, W, Ta, and Re).

3. The lithium metal compound oxide according to claim 1,
   wherein the lithium metal compound oxide is expressed by general formula of $Li_{1+x}M_{1-x}O_2$ (M includes Mn, Co, and Ni) and a content molar ratio of Mn, Co, and Ni is Mn:Co:Ni=35 or less:0.05 to 0.40:0.45 or more.

4. The lithium metal compound oxide according to claim 1, wherein the lithium metal compound oxide is prepared by pulverizing a mixed powder of Li and the elements that comprise M using a high-speed rotary pulverizer at a rotation speed of 4000 rpm or more.

5. A lithium ion battery comprising:
   the lithium metal compound oxide according to claim 1 as a positive electrode active material.

6. A lithium ion battery for a hybrid electric vehicle or an electric vehicle, comprising:
   the lithium metal compound oxide according to claim 1 as a positive electrode active material.

7. A lithium ion battery comprising:
   the lithium metal compound oxide according to claim 2 as a positive electrode active material.

8. A lithium ion battery comprising:
   the lithium metal compound oxide according to claim 3 as a positive electrode active material.

9. A lithium ion battery for a hybrid electric vehicle or an electric vehicle, comprising:
   the lithium metal compound oxide according to claim 2 as a positive electrode active material.

10. A lithium ion battery for a hybrid electric vehicle or an electric vehicle, comprising:
    the lithium metal compound oxide according to claim 3 as a positive electrode active material.

* * * * *

UNITED STATES PATENT AND TRADEMARK OFFICE
CERTIFICATE OF CORRECTION

PATENT NO.           : 9,640,794 B2
APPLICATION NO.      : 14/396510
DATED                : May 2, 2017
INVENTOR(S)          : Tetsuya Mitsumoto et al.

It is certified that error appears in the above-identified patent and that said Letters Patent is hereby corrected as shown below:

On the Title Page

Column 1, Item (54), delete "LITHIUM TRANSITION METAL OXIDE HAVING LAYERED STRUCTURE" and insert -- LITHIUM METAL COMPOUND OXIDE HAVING LAYERED STRUCTURE --

In the Specification

Column 1, Lines 1-2, delete "LITHIUM TRANSITION METAL OXIDE HAVING LAYERED STRUCTURE" and insert -- LITHIUM METAL COMPOUND OXIDE HAVING LAYERED STRUCTURE --

In the Claims

Column 20, Line 28, Claim 3, delete "Mn:Co:Ni=35" and insert -- Mn:Co:Ni=0.35 --

Signed and Sealed this
Fifth Day of September, 2017

Joseph Matal
*Performing the Functions and Duties of the
Under Secretary of Commerce for Intellectual Property and
Director of the United States Patent and Trademark Office*